US008826081B2

(12) United States Patent
Hopkins et al.

(10) Patent No.: US 8,826,081 B2
(45) Date of Patent: Sep. 2, 2014

(54) DATA PROCESSING APPARATUS AND RELATED METHODS OF DEBUGGING PROCESSING CIRCUITRY

(71) Applicant: UltraSoC Technologies Ltd., Cambridge (GB)

(72) Inventors: Andrew Brian Thomas Hopkins, Kent (GB); Stephen John Barlow, Cambridge (GB); Constantine Krasic, Cambridge (GB)

(73) Assignee: Ultrasoc Technologies, Ltd., Cambridge (GB)

( * ) Notice: Subject to any disclaimer, the term of this patent is extended or adjusted under 35 U.S.C. 154(b) by 0 days.

(21) Appl. No.: 13/690,923

(22) Filed: Nov. 30, 2012

(65) Prior Publication Data

US 2013/0111274 A1    May 2, 2013

Related U.S. Application Data

(63) Continuation-in-part of application No. 13/244,023, filed on Sep. 23, 2011.

(30) Foreign Application Priority Data

Aug. 25, 2011   (GB) .................................. 1114715.4
May 16, 2012   (GB) .................................. 1208613.8

(51) Int. Cl.
*G06F 11/273*   (2006.01)
*G06F 11/36*    (2006.01)
(52) U.S. Cl.
CPC ........ *G06F 11/3636* (2013.01); *G06F 11/3656* (2013.01)
USPC ................................. 714/37; 714/27; 714/30

(58) Field of Classification Search
CPC ... G06F 11/34; G06F 11/3476; G06F 11/348; G06F 11/349
USPC .................................................. 714/27, 30, 37
See application file for complete search history.

(56) References Cited

U.S. PATENT DOCUMENTS 7,080,283 B1 *   7/2006   Songer et al. .................... 714/30
8,234,531 B2 *   7/2012   Mayer ........................... 714/734

(Continued)

FOREIGN PATENT DOCUMENTS

| EP | 1302857 A2 | 4/2003 |
| GB | 2476892 A | 7/2011 |
| JP | 2010-176537 A | 8/2010 |

OTHER PUBLICATIONS

GB Office Action and Search Report, GB Application No. GB1114715.4, Dec. 8, 2011, 4 pages.

(Continued)

*Primary Examiner* — Chae Ko
(74) *Attorney, Agent, or Firm* — Fenwick & West LLP (57) ABSTRACT

A data processing apparatus having processing circuitry and debug circuitry is debugged by operating the processing circuitry to generate data. The debug circuitry is employed to generate trace elements indicative of the operation of the processing circuitry. Trace elements are caused to be output from the data processing apparatus over a communication bus capable of connecting a plurality of devices. The communication bus is controlled by a protocol for data interchange requiring data interchange from any device on the communication bus to be controlled by a single processing system. The passing of the trace elements onto the communication bus is controlled using an interface unit of the debug circuitry. The interface unit comprises a controller arranged to allow each of the interface unit and processing circuitry to be separate processing systems which can each independently control data interchange from the data processing apparatus.

20 Claims, 2 Drawing Sheets

(56) References Cited

U.S. PATENT DOCUMENTS

| | | |
|---|---|---|
| 2002/0078264 A1 | 6/2002 | Eberhard |
| 2003/0237074 A1* | 12/2003 | Kwon .......................... 717/124 |
| 2004/0123012 A1* | 6/2004 | Ellerbrock et al. ........... 710/305 |
| 2005/0166098 A1* | 7/2005 | Davis ............................. 714/45 |
| 2006/0248257 A1* | 11/2006 | Kojima ......................... 710/316 |
| 2007/0006154 A1* | 1/2007 | Yang et al. .................... 717/124 |
| 2009/0198859 A1* | 8/2009 | Orishko et al. ............... 710/313 |
| 2010/0318848 A1* | 12/2010 | Yang et al. ..................... 714/30 |
| 2011/0072184 A1* | 3/2011 | Tateyama et al. ............. 710/308 |
| 2011/0125937 A1* | 5/2011 | Ito et al. ......................... 710/36 |
| 2011/0145445 A1* | 6/2011 | Malamant et al. .............. 710/16 |
| 2011/0149843 A1* | 6/2011 | Hwang et al. ................. 370/328 |
| 2011/0239196 A1* | 9/2011 | Ichard .......................... 717/127 |
| 2013/0007532 A1* | 1/2013 | Miller et al. .................... 714/45 |
| 2013/0007533 A1* | 1/2013 | Miller et al. .................... 714/45 |
| 2013/0097462 A1* | 4/2013 | Singh et al. .................... 714/39 |

OTHER PUBLICATIONS

GB Office Action and Search Report, GB Application No. GB1208613.8, Jun. 13, 2012, 7 pages.

GB Response to Office Action, GB Application No. GB1208613.8, Aug. 6, 2012, 14 pages.

Synopsys, "Synopsys DesignWare USB 2.0 PHY IP Cores," 2013, 1 page, [online] [retrieved Apr. 18, 2013, retrieved from the internet <http://www.synopsys.com/dw/ipdir.php?ds=dwc_usb_2_0_phy>].

Synopsys, "Synopsys DesignWare USB 2.0 Digital Controller IP Cores," 2013, 1 page, [online] [retrieved Apr. 18, 2013, retrieved from the internet <http://www.synopsys.com/dw/ipdir.php?ds=dwc_usb_2_0_digital_controllers>].

* cited by examiner

DATA PROCESSING APPARATUS AND RELATED METHODS OF DEBUGGING PROCESSING CIRCUITRY

FIELD OF THE INVENTION

The present invention relates to a data processing apparatus and related methods. In particular the invention may relate to a System On a Chip (SoC).

BACKGROUND OF THE INVENTION

Modern data processing apparatus are becoming ever more complex and more and more complex systems are now commonly being provided as Systems On Chip (SoCs). As such, the tracing and debugging of such circuits is becoming more problematic and typically apparatus needs to be debugged without halting the operation of the apparatus. In order to achieve such debugging with the apparatus running, debug circuitry is provided to monitor the functioning of the processing apparatus. This monitoring typically generates so-called trace data which is passed from the debug circuitry and out of the processing apparatus. The trace data can then be analysed to debug the functionality of the processing apparatus.

Handling the volume of such trace data can in itself be difficult when it is considered that circuits often operate at a clock frequency of Gigahertz. Such frequencies mean that significant amounts of trace data are generated and typically this would be of the order of a Gbit/s from a single core. This problem is compounded when it is considered that a modern SoC, etc. will often contain a plurality of such cores. As such, it can be difficult to move this amount of information from the processing apparatus.

One solution to this has been proposed by the MIPI™ alliance (www.mipi.org) which uses the processing circuitry of the processing apparatus being debugged to control communication over a USB (ie Universal Serial Bus) communication bus. Such a solution allows the USB communication bus to be used to output a stream of trace elements without significantly increasing the amount of circuitry required on the SoC.

It does however alter the operation of the processing circuitry of the processing apparatus.

SUMMARY OF THE INVENTION

According to a first aspect of the invention there is provided a data processing apparatus, typically comprising processing circuitry, which in use, generates data, debug circuitry arranged to debug operation of the processing circuitry and an interface unit which may contain a controller arranged to control operation of the interface unit, wherein each of the processing circuitry and the interface unit constitute a single processing system and wherein the processing apparatus typically includes bus circuitry arranged to pass data into and/or out of the processing apparatus over a communication bus capable of connecting a plurality of devices;

wherein the communication bus may be controlled by a protocol for data interchange requiring data interchange from any device on the communication bus to be controlled by a single processing system;

the debug circuitry may comprise monitoring circuitry arranged to monitor the data generated, in use, by the processing circuitry and generate a stream of trace elements; and the interface unit may be provided and arranged to interface, using the bus circuitry, the trace elements generated by the monitoring circuitry onto the communication bus to be output, in use, from the processing apparatus using the communication bus such that each of the processing circuitry and the interface unit are arranged to independently control data interchange from the data processing apparatus.

An embodiment which provides the interface unit and the processing circuitry as independent devices on the communication bus is a convenient way to allow the debug circuitry to access the communication bus and yet allow the processing circuitry to operate independently. As such, operation of the processing circuitry may continue unaffected by operation of the debug circuitry. In such embodiments, it will be appreciated that the processing circuitry and the debug circuitry may each contain controllers to implement the higher layers of the communication bus.

Embodiments providing such a structure are advantageous because provision of the interface unit provides the necessary intelligence to allow the trace elements to be output on to the communication bus. Such an output on to the communication bus can occur without affecting the operation of the processing circuitry and will also allow the stream of trace elements to be output when the processing circuitry is not functioning, or at least not functioning correctly. It is believed the advantage of such embodiments may outweigh the increase in circuitry required to implement them.

In some embodiments, the communication bus may be what is termed a peripheral bus.

Using a communication bus, that has a high speed interface, available for outputting trace elements means that at least some embodiments of the invention may be arranged such that the debug circuitry is arranged to output the stream of trace elements onto the communication bus substantially as the trace elements are generated. The skilled person will appreciate that this may be thought of as being in real-time as the processing circuitry generates data. It will be appreciated that storing trace elements within the processing apparatus would mean that the debug circuitry would need to contain a significant amount of memory. Some embodiments may be arranged to buffer trace elements before they are output on the communication bus.

The skilled person will appreciate that the architecture of a typical communication bus requires functionality in the higher layers of the architecture which is often provided in firmware/software and as such would conveniently be provided by the processing circuitry. The lower levels such as the physical (PHY) and Media Access Control (MAC) layers will typically be provided within hardware.

The skilled person will further appreciate that adding an interface unit in which the intelligence is provided to allow the interface unit to operate as a single processing system adds cost and complexity thereto as well as taking up space within the design. However, using an existing interface of the processing apparatus can mitigate these disadvantages over other approaches in which a dedicated debug interface might be added.

In one embodiment the communication bus is a USB bus. Conveniently, the USB is of USB 2.x or 3.x (where x is an integer number). However, other embodiments could conceivably implement USB 1.x (again where x is an integer number). USB is advantageous because of its sufficiently high data rates which are necessary in order to get high volumes of data removed from the processing apparatus together with its widespread acceptance. The skilled person will appreciate that the USB bus standard is widely adopted and embodiments using such a bus would likely be able to be interfaced to a wide range of apparatus.

However, in other embodiments, the communication bus may be any one or more of the following: Firewire®; Thunderbolt®; SATA™ (Serial Advanced Technology Attachment); eSATA™ (External Serial Advanced Technology Attachment); SAS™ (Serial Attached SCSI (Small Computer Systems Interface); PCI Express® (Peripheral Component Interconnect); Ethernet; Fibre Channel; HyperTransport®; Interlaken; and InfiniBand®. The skilled person will also appreciate that as technology matures further there may well be other bus architectures that could be utilised.

The bus circuitry is typically arranged to allow the processing circuitry to connect or otherwise pass data onto the communication bus. Typically, communication buses of embodiments of the invention will comprise a layered protocol and the bus circuitry may provide the lower layers of the communication bus. For example, the bus circuitry may provide the Physical (PHY) and Media Access Control (MAC) layers. Higher layers may typically be provided by the processing circuitry and/or the interface unit.

Some embodiments may provide further bus circuitry within the interface unit, typically arranged to connect or otherwise allow the debug circuitry to pass data onto the communication bus. In such embodiments, some of the components of the bus circuitry may be simplified when compared to the bus circuitry typically provided.

The controller within the interface unit may be implemented in hardware, perhaps as a state machine or the like. In particular, and referring to USB as an example, embodiments of the invention may allow a typical USB Level 3+ (i.e. levels above the MAC layer, wherein the MAC layer is deemed to be level 2 and the physical (PHY) layer is deemed to be level 1) controller to be simplified and in order that it may be implemented as a hardware block. For example, it is likely that the use of endpoints and support for different data flow types could be simplified.

However, in alternative, or additional embodiments, the controller may be implemented as firmware within the debug circuitry. The skilled person will appreciate that embodiments that implement the controller in firmware are likely to need further circuitry when compared to a hardware implementation.

The interface unit may comprise a hub and as such, the hub may, in those embodiments having a hub, may be thought of as bus circuitry. In the case of embodiments in which the communication bus is a USB bus it is likely that the interface unit will include components additional to the hub. Such an arrangement is convenient as it allows the debug circuitry to appear on the bus circuitry as a separate node from the processing circuitry thereby allowing the two to function as separate devices on the communication bus.

Whilst the skilled person will appreciate that the term hub is known within the USB standard, an equivalent device may be termed differently in other bus protocols. For example, an equivalent device may be termed a switch or a bridge in other protocols.

The interface unit may also include an additional Media Access Control (MAC) block. Again, in embodiments having a MAC block this may be thought of as bus circuitry.

The interface unit may connect between the MAC and Physical (PHY) layers of the bus circuitry provided on the processing apparatus. Such an arrangement provides an efficient way to integrate the interface unit onto the communication bus as there is often a standard interface defined for the MAC to PHY connection. In the case of USB 2.0, this interface is called UTMI (USB 2.0 Transceiver Macrocell Interface) or ULPI (UMTI+Low Pin Interface). In the case of USB 3.0, this interface is called PIPE3 (PHY Interface for the PCI Express and USB architecture). This allows a single interface unit to be designed to be used with different manufacturer's implementations of the bus circuitry.

In some embodiments, the hub and/or additional MAC block may be simplified versions. For example, power management functions may be removed from either or both of these blocks. Such an arrangement is convenient since it will reduce the physical size of these blocks and will also reduce the cost of implementing them.

Embodiments are typically arranged to allow the communication bus to carry data to the debug circuitry as well away from the debug circuitry (ie to implement bi-directional communication). Such two-way communication is advantageous as it allows the debug circuitry to be controlled from outside of the processing apparatus as well as allowing data to be passed off the processing apparatus.

Typically embodiments of the invention are arranged such that the interface unit, or at least portions of the interface unit, may be switched out of communication with the bus circuitry. Such an arrangement is convenient as it may allow for reduced power consumption during normal operation of the circuit, etc. Power reduction may have the greatest impact for embodiments which have a simplified hub within the interface unit since this may not then offer lower power modes typically provided. It is also conceivable that the presence of the interface unit may reduce the data transfer rate of the bus circuitry and switching at least a portion of the interface unit out of communication with the bus circuitry may increase the data throughput that the processing circuitry is able to achieve over the bus circuitry.

In one particular embodiment, it is the hub of the interface unit that is arranged to be switchable. For example, the interface unit may be arranged such that it can be logically connected and disconnected during operation in a manner that appears to a host arranged to control the bus and/or processing circuitry as standard plug/unplug behaviour. The skilled person will appreciate that USB (and indeed other buses) are so-called 'hot-swappable' in which devices can safely be disconnected/connected whilst power is applied to them. Such connection/disconnection may be referred to as plug/unplug.

The host is conveniently mounted remote from the data processing apparatus and typically connected thereto by the communication bus.

Typically, the processing apparatus is arranged such that the trace elements are output from the processing apparatus, over the communication bus, during normal operation of the processing apparatus. Here normal is typically intended to mean during provision of the intended function of the processing apparatus and not during a debug mode, or the like.

In some embodiments, the processing apparatus is arranged such that the processing circuitry, or at least portions (such as a processor) thereof, are held in a reset state whilst the interface unit (or portions thereof) is switched into or out of communication with the bus circuitry.

The processing apparatus may be a System on Chip (SoC).

According to a second aspect of the invention there is provided debug logic, arranged to monitor processing circuitry, wherein the debug logic typically comprises at least one of the following:

monitoring circuitry arranged to perform the monitoring of the processing circuitry and generate a stream of trace elements;

an interface unit arranged to interface the trace elements generated by the monitoring circuitry on to a communication bus capable of connecting a plurality of devices and used by the processing circuitry being monitored wherein the communication bus may be controlled by a protocol for data interchange requiring data interchange from any device on the communication bus to be controlled by a single processing system;

wherein the interface unit may comprise a controller arranged such that each of the interface unit and the processing circuitry constitute single processing systems, the debug logic being arranged such that each of the processing circuitry and the interface unit may be arranged to independently control data interchange from the data processing apparatus.

Some embodiments of the invention may be arranged such that the debug logic appears as a separate device on the communication bus to the processing circuitry that the debug logic is arranged to monitor.

According to a third aspect of the invention there is provided a method of debugging a data processing apparatus having processing circuitry and debug circuitry comprising at least some of the following steps of:

operating the processing circuitry to generate data;
employing debug circuitry to generate trace elements indicative of the operation of the processing circuitry;
causing the trace elements to be output from the data processing apparatus over a communication bus capable of connecting a plurality of devices and wherein the communication bus may be controlled by a protocol for data interchange requiring data interchange from any device on the communication bus to be controlled by a single processing system; and
controlling the passing of the trace elements onto the communication bus using an interface unit of the debug circuitry wherein the interface unit comprises a controller arranged to allow each of the interface unit and processing circuitry to be separate processing systems which can each independently control data interchange from the data processing apparatus.

Embodiments employing such a method are advantageous in that they can output high volumes of debug data (e.g. trace elements) over the communication bus of the processing apparatus.

The debug circuitry may be according to the second aspect of the invention.

According to a fourth aspect of the invention there is provided a machine readable medium containing instructions which when read onto a machine cause that machine to perform the method of the third or fourth aspects of the invention.

According to a fifth aspect of the invention there is provided a machine readable medium containing instructions which when read by a machine cause that machine to fabricate, or at least simulate, the apparatus of the first aspect of the invention or the debug logic of the second aspect of the invention.

The instructions held on the machine readable medium may be arranged to interchange integrated circuit layout. In one embodiment, the instructions are held in GDSii (Graphical Database System ii) file format. The instructions may alternatively be arranged to synthesise the required logic circuitry. In an embodiment of this, the instructions may be held in the Verilog® or VHSIC Hardware Description Language (VHDL).

The machine readable medium may for example be any of the following formats: a floppy disc; a CD ROM/RAM; a DVD ROM/RAM (including −R/−RW and +R/+RW); a memory (for example a flash memory; an SD card; a solid state drive (SSD); a USB memory stick); a hard drive; any form of magneto-optical storage; a tape; an Internet download (including an FTP download or the like); a wire.

The skilled person will appreciate that the features described in relation to any one of the above aspects of the invention may be applied mutatis mutandis to any of the other aspects of the invention.

BRIEF DESCRIPTION OF THE DRAWINGS

There now follows a detailed description of embodiments of the invention, with reference to the accompanying drawings of which.

DETAILED DESCRIPTION OF THE DRAWINGS

Figure 1:
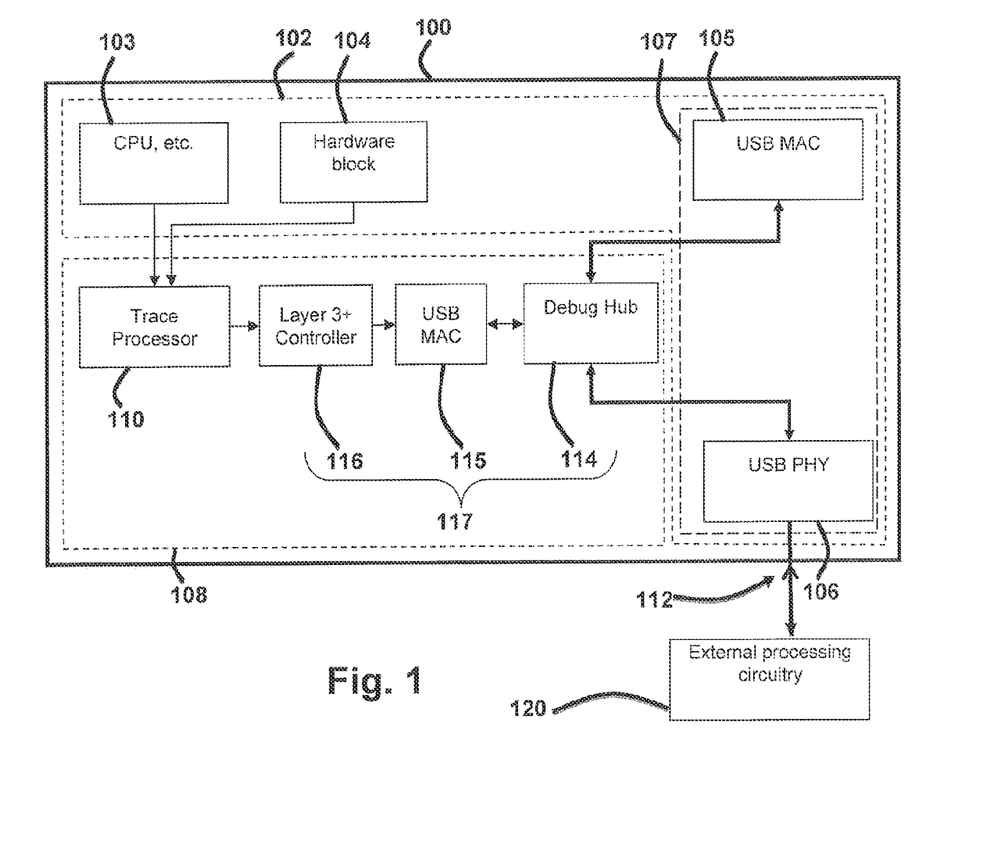
FIG. 1 is a schematic diagram showing components of an embodiment of the present invention.

FIG. 1 shows some of the components of a typical processing apparatus 100. The skilled person will note that for the sake of clarity many blocks are omitted. However, the processing apparatus 100 comprises processing circuitry 102, including a processor 103, and a representative hardware block 104 which together will provide the functionality of the processing apparatus 100. The processing apparatus 100 is often now provided as a System On Chip (SoC). In use, data is generated by processing circuitry 102 and in particular by blocks such as the processor 103 and hardware block 104.

The processing circuitry 102 includes USB bus circuitry 107 and typically the bus circuitry includes a USB MAC 105 and USB PHY 106. The bus circuitry 107 controls how data is passed onto a communication bus 112 of the processing apparatus. It is convenient to describe embodiments of the invention relative to USB bus circuitry but the skilled person will appreciate that the concepts outlined herein are equally applicable, mutatis mutandis, to other bus protocols/communication buses.

The skilled person will appreciate that USB MAC 105 and USB PHY 106 blocks are commercially available. Suitable blocks may be obtained from Synopsys Inc. of 700 East Middlefield Rd., Mountain View, Calif. 94043-4033, U.S.A.: In particular a suitable USB 2.0 MAC is the DesignWare USB 2.0 Device Controller http://www.synopsys.com/dw/ipdir.php?ds=dwc_usb_2_0_digital_controllers. A suitable USB 2.0 PHY is the DesignWare USB 2.0 nanoPHY http://www.synopsys.com/dw/ipdir.php?ds=dwc_usb_2_0_phy.

The processing apparatus 100 also comprises debug circuitry 108 which is arranged to facilitate debugging of the processing circuitry 102; i.e. to debug operation of the processing circuitry. Again, and for reasons of clarity, only some of the blocks of the debug circuitry have been shown. The debug circuitry 108 may also be thought of as being debug logic.

Both the processor 103 and the hardware block 104 may be monitored by the debug circuitry 108 and the skilled person will appreciate that in some embodiments the debug circuitry 108 may be used to monitor a plurality of such blocks and other blocks. The term processing circuitry is intended to cover circuitry which would be considered to be a processor as well as other circuitry not typically considered to be a processor.

In particular, the debug circuitry 108 comprises a trace processor 110 arranged to monitor the processing circuitry 102. As such, the trace processor 110 may be thought of as monitoring circuitry. In use, the trace processor will generate a stream of trace elements which can be used by off-chip apparatus (i.e. apparatus which is external to the processing apparatus 100). However, in order to allow the trace elements to be used to debug the processing circuitry 102 the trace elements are output from the processing apparatus 100 and the embodiment being described utilises the USB communication bus 112 of the processing apparatus 100 to achieve this. As such, the trace elements would be a bus communication; i.e. data sent over the communication bus.

In embodiments which provide the processing apparatus 100 as a SoC then, in use, the trace elements generated by the trace processor 110 will appear on the pins (or other connectors) of the SoC provided for a bus connection of the SoC and in this case the USB bus of the SoC.

To interface the trace processor 110 to the USB communication bus 112 of the processing apparatus a debug hub 114 is implemented within the debug circuitry 108. As such, the debug hub 114 may be thought of as at least a portion of an interface unit 117 which connects the trace processor 110/debug circuitry to the USB communication bus 112. Indeed, it will be seen that the debug hub 114 is positioned between existing components of the bus circuitry 107 (e.g. the USB MAC 105 and the USB PHY 106); i.e. at least portions of the debug circuitry are positioned between existing components of the bus circuitry 107. The debug hub 114 is a modified USB hub, since a standard USB hub would have PHY interfaces, and in this embodiment they can be dispensed with and there may be other simplifications in addition to the removal of the PHY interfaces.

In addition to the debug hub, there is provided a USB MAC 115 and higher level protocol controller 116 (i.e. a controller) to connect the debug hub 114 to the endpoints within the debug circuitry 108. In the embodiment being described, the debug hub 114, the USB MAC 115 and the controller 116 each form a part of the interface unit 117 arranged to interface the trace processor 110 via the bus circuitry 107 to the USB communication bus 112 and it will be seen that in the embodiment being described the interface unit 117 is connected (i.e. interposed) between the USB MAC 105 and the USB PHY 106.

The interface unit 117 allows the stream of trace elements generated by the monitoring circuitry (i.e. the trace processor 110) to be interfaced onto the USB communication bus 112 independently of the operation of the processing circuitry 102. That is, the processing circuitry 102 functions as if the debug circuitry 108 was not monitoring the processing circuitry and outputting data over the USB communication bus 112. This might mean for example, that the processor 103 does need to process any instructions to move the stream of trace elements onto the USB communication bus 112. It may also mean that the software running on the processor 103 does not need to be modified as a result of using the monitoring circuitry and outputting the trace elements.

The skilled person will appreciate the following, but for the avoidance of doubt, USB is implemented as a tree network. At the root of the tree is a host (e.g. 120) which initiates communications. At the leaves are devices. Each device can offer a single endpoint or a number of endpoints wherein an endpoint is also often referred to as a separate communication channel. Endpoint zero (0) is a special endpoint used for managing the connection of a device/endpoint to the network. At the nodes of the tree, there are hubs that allow multiple downstream devices or further hubs to be connected to a single upstream connection to the host.

Thus, putting this into context with FIG. 1, it is likely that a host (e.g. 120) will be connected to the USB communication bus 112 and be provided external to the processing apparatus 100. The debug hub 114 allows the interface unit 117 (and therefore also the debug circuitry 108) to function as a separate device to that of the processing circuitry 102 on the USB network formed by the various processing circuitry provided on the USB bus and connected to the USB communication bus 112. In some embodiments, the debug hub 114, USB MAC 115 and layer 3+ controller 116 may connect a plurality of endpoints and/or devices within the debug circuitry 108 to the USB communication bus 112.

USB uses a layered protocol. Whilst the Physical (PHY) layer and Media Access Control (MAC) layers are implemented in hardware, the higher layers are sufficiently complex that they are usually implemented in software (or firmware). Most SoCs want to provide general USB functionality with the ability to support different endpoints and applications, so it is usual to use one of the processors (e.g. processor 103) in the SoC to run the software required to operate the USB communication bus 112.

In the embodiment being provided the higher layers of the debug circuitry device are implemented in a layer 3+ controller 116 which may be provided as a firmware programmable block or indeed may, as discussed later, be sufficiently simplified to be provided as a hard-wired block (as a state machine or the like). Thus, the interface unit 117 is provided with sufficient intelligence to allow it to be a separate device on the communication bus 112.

The structure of USB is also such that it is not possible to partition the interface so different endpoints can be managed by different software stacks and a single piece of software needs to control the whole of a USB device. Therefore, the skilled person will appreciate that USB is an example of a protocol in which each device that communicates on the communication bus requires a single processing system to control data interchange between that device and the communication bus. Here, data interchange is intended to mean passing data (for example the trace elements and or data generated by the processing circuitry) onto or from the communication bus. Thus, a device is intended to mean circuitry that is capable of independent processing, of independent communication over the communication bus, or the like. In some embodiments the device may be a device within the meaning of the USB protocol but in other embodiments the term may not be so limited.

Because the hub 114 is within the processing apparatus 100 (e.g. a SoC) and is only used for debug, it does not have to support the power management functions of a "real" hub and can be substantially simplified in comparison to such a real hub; the debug device is restricted to a fixed configuration with a single functional endpoint transferring debug data per direction. This approach can be expanded to a solution where several end-points are used, either to separate different types or priorities of debug data or to achieve higher performance. In order to reduce the intrusive effects of the debug data on the system, the hub may conspire with the debug device to report less debug data to the host as available than is actually available, so that more communication bus 112 bandwidth is available to the processing circuitry 102.

The layers above the MAC (e.g. the controller 116) may also be substantially simplified compared with the normal USB device software stack. This means that it can be implemented by a hard-wired state machine, or the like, although a dedicated processor running this code within the debug block may, in some embodiments, also be an effective solution.

The hub can either always be present in the design, or switchable (i.e. disconnectable), so it is only enabled when debugging is required and is therefore not visible to the host in normal application use. The hub can be switched in or out while the main processor is held in a reset state. Such switching can help to increase stability of the debug circuitry/processing apparatus. Alternatively the debug hub circuitry can be connected all the time with the switching of the hub realised as a change in logical behaviour, such that the hub is either visible to the device and host or apparently absent and a switching device may be provided in order to effect this change in logical behaviour. Such an arrangement allows the hub to emulate a physical disconnection of the system device followed by a logical reconnection where the presence of the debug hub has changed. This approach has the advantage that the hub can be switched in a stable way without the processor 103 or system USB MAC 105 being in a reset state.

Figure 2:
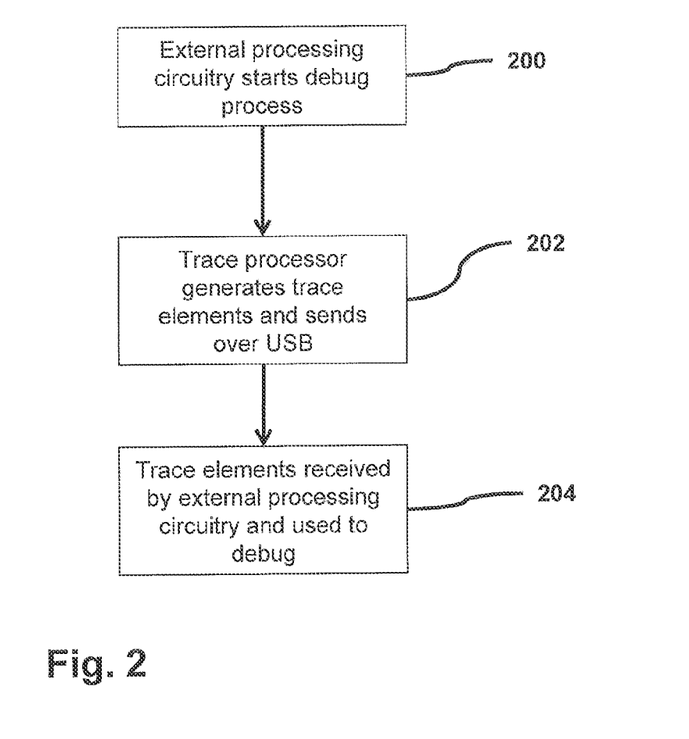
FIG. 2 is a flow chart outlining method steps of one embodiment of the invention.

Thus, as described with reference to FIG. 2, to debug the processing circuitry, a computing apparatus 120 (such as a PC, or perhaps a dedicated computing apparatus) is connected to the USB communication bus 112 and arranged to send commands to the trace processor 110 across the USB communication bus 112 (step 200). Thus, during operation, the external processing circuitry 120 instructs, by sending instructions thereto, the trace processor 110 to begin monitoring the processing circuitry 102 (step 202). Thus, the trace processor 110 generates trace elements which are passed onto the USB network (via the controller 116, the USB MAC 115 and the debug hub 114) to the USB communication bus 112 to the external processing circuitry 120 arranged to receive and process those trace elements (step 204).

Thus, in summary, FIG. 1 shows an embodiment in which the processing apparatus 100 comprises two controllers: the controller 116 within the interface unit 117 of the debug circuitry 108 and a controller provided by a processor (perhaps block 103) of the processing circuitry. Thus, each of the interface unit 117 and the processing circuitry 102 may each be thought of as being single processing systems; i.e. each being a component of the processing apparatus capable of controlling data interchange over the communication bus 112. Thus, in the embodiment being described the processing apparatus 100 comprises two separate devices: the interface unit 117 (and therefore, also the debug circuitry 108) and the processing circuitry 102.

However, other embodiments may provide a different arrangement to allow the processing circuitry 102 to use the communication bus 112 independently of the operation of the debug circuitry (i.e. without the debug circuitry affecting operation of the processing circuitry). In the embodiment of FIG. 1, each of the controllers is arranged such the processing circuitry and the debug circuitry appear as separate devices on the communication bus 112.

In one such alternative embodiment, each of the processing circuitry 102 and the debug circuitry 108 may again each comprise a controller. However, the controller within the debug circuitry may be arranged to receive and terminate bus communication and synthesise a new USB connection to the processing circuitry 102 containing only the bus communication intended for the processing circuitry. As such, the processing circuitry could continue to operate independently of the debug circuitry and continue to operate unaffected by the debug circuitry but the debug circuitry and processing circuitry would not appear as separate devices on the communication bus 112. In such an embodiment, there would be a single device on the communication bus and the controller of the debug circuitry would have sufficient intelligence to forward bus communications to and from the correct destinations.

In both the embodiments described above, each of the processing circuitry 102 and debug circuitry 108 has its own controller.

The skilled person will appreciate the equivalence of hardware, software and firmware and as such that typically logic can be implemented in any of these. Thus, these terms, accept where the context specifies otherwise, are used interchangeably.

The invention claimed is:

1. A data processing apparatus, comprising processing circuitry, which in use, generates data, debug circuitry arranged to debug operation of the processing circuitry and an interface unit containing a controller arranged to control operation of the interface unit, wherein each of the processing circuitry and the interface unit constitute a single processing system and wherein the processing apparatus includes bus circuitry arranged to pass data into and/or out of the processing apparatus over a communication bus capable of connecting a plurality of devices;

wherein the communication bus is controlled by a protocol for data interchange requiring data interchange from any device on the communication bus to be controlled by a single processing system;

the debug circuitry comprises monitoring circuitry arranged to monitor the data generated, in use, by the processing circuitry and generate a stream of trace elements; and the interface unit being arranged to interface, using the bus circuitry, the trace elements generated by the monitoring circuitry onto the communication bus to be output, in use, from the processing apparatus using the communication bus such that each of the processing circuitry and the interface unit are arranged to independently control data interchange from the data processing apparatus.

2. An apparatus according to claim 1 in which each of the processing circuitry and interface unit appear as separate devices on the communication bus.

3. An apparatus according to claim 1 in which the interface unit is arranged such that it is disconnectable from the bus circuitry and/or communication bus.

4. An apparatus according to claim 3 in which at least a portion of the processing circuitry is arranged to be held in a reset state in order to disconnect the interface from the bus circuitry.

5. An apparatus according to claim 3 in which the interface is arranged such that it can be logically connected and disconnected during operation in a manner that appears to the host and processing circuitry as standard plug/unplug behaviour.

6. An apparatus according to claim 1 in which at least portions of the debug circuitry are interposed between blocks of the bus circuitry.

7. An apparatus according to claim 1 in which the controller is implemented as a state machine.

8. An apparatus according to claim 1 in which the communication bus is a USB bus.

9. An apparatus according to claim 1 in which the interface unit comprises a USB hub.

10. Debug logic, arranged to monitor processing circuitry, wherein the debug logic comprises the following:

monitoring circuitry arranged to perform the monitoring of the processing circuitry and generate a stream of trace elements;

an interface unit arranged to interface the trace elements generated by the monitoring circuitry on to a communication bus capable of connecting a plurality of devices and used by the processing circuitry being monitored wherein the communication bus is controlled by a protocol for data interchange requiring data interchange from any device on the communication bus to be controlled by a single processing system;

wherein the interface unit comprises a controller arranged such that each of the interface unit and the processing circuitry constitute single processing systems, with the debug logic being arranged such that each of the processing circuitry and the interface unit are arranged to independently control data interchange from the data processing apparatus.

11. Logic according to claim 10 which is arranged to be disconnectable from the communication bus to which it interfaces.

12. Logic according to claim 10 which is arranged to have at least portions thereof to be interposed between components of bus circuitry in which the debug logic is implemented.

13. Logic according to claim 10 which is arranged to interface with a USB communication bus.

14. Logic according to claim 13 in which the interface includes a USB hub.

15. Logic according to claim 14 in which the USB hub is arranged to be interposed between a USB MAC block and a USB PHY block.

16. Logic according to claim 10 which is arranged such that the debug circuitry appears as a separate device on the communication bus to the processing circuitry that it is, in use, monitoring.

17. A method of debugging a data processing apparatus having processing circuitry and debug circuitry comprising the following steps of:

operating the processing circuitry to generate data;

employing debug circuitry to generate trace elements indicative of the operation of the processing circuitry;

causing the trace elements to be output from the data processing apparatus over a communication bus capable of connecting a plurality of devices and wherein the communication bus being is controlled by a protocol for data interchange requiring data interchange from any device on the communication bus to be controlled by a single processing system; and controlling the passing of the trace elements onto the communication bus using an interface unit of the debug circuitry wherein the interface unit comprises a controller arranged to allow each of the interface unit and processing circuitry to be separate processing systems which can each independently control data interchange from the data processing apparatus.

18. A method according to claim 17 in which each of the processing circuitry and the debug circuitry appear as separate devices on the communication bus.

19. A non-transitory machine readable medium containing executable instructions which when read onto a machine cause that machine to perform a method of debugging a data processing apparatus having processing circuitry and debug circuitry comprising:

operating the processing circuitry to generate data;

employing debug circuitry to generate trace elements indicative of the operation of the processing circuitry;

causing the trace elements to be output from a data processing apparatus over a communication bus capable of connecting a plurality of devices and wherein the communication bus being is controlled by a protocol for data interchange requiring data interchange from any device on the communication bus to be controlled by a single processing system; and controlling the passing of the trace elements onto the communication bus using an interface unit of the debug circuitry wherein the interface unit comprises a controller arranged to allow each of the interface unit and processing circuitry to be separate processing systems which can each independently control data interchange from the data processing apparatus.

20. A machine readable medium according to claim 19 in which each of the processing circuitry and the debug circuitry appear as separate devices on the communication bus.

* * * * *

UNITED STATES PATENT AND TRADEMARK OFFICE
CERTIFICATE OF CORRECTION

PATENT NO. : 8,826,081 B2  
APPLICATION NO. : 13/690923  
DATED : September 2, 2014  
INVENTOR(S) : Hopkins et al.

Page 1 of 1

It is certified that error appears in the above-identified patent and that said Letters Patent is hereby corrected as shown below:

Claims

Column 11, line 36, Claim 17, after "bus" please delete "being".

Signed and Sealed this
Sixth Day of October, 2015

Michelle K. Lee
*Director of the United States Patent and Trademark Office*